(12) United States Patent
Han et al.

(10) Patent No.: US 9,023,156 B2
(45) Date of Patent: May 5, 2015

(54) DISH WASHER

(75) Inventors: Jungyoup Han, Seoul (KR); Jaechul Lee, Seoul (KR); Yongjin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/602,499

(22) Filed: Sep. 4, 2012

(65) Prior Publication Data

US 2013/0056040 A1    Mar. 7, 2013

(30) Foreign Application Priority Data

Sep. 1, 2011   (KR) .................. 10-2011-0088678
Sep. 1, 2011   (KR) .................. 10-2011-0088679

(51) Int. Cl.
*A47L 15/42*  (2006.01)
*A47L 15/48*  (2006.01)

(52) U.S. Cl.
CPC ......... *A47L 15/4217* (2013.01); *A47L 15/4285* (2013.01); *A47L 15/4291* (2013.01)

(58) Field of Classification Search
CPC ................ A47L 15/4214; A47L 15/4217
See application file for complete search history.

(56) References Cited

U.S. PATENT DOCUMENTS

| | | | |
|---|---|---|---|
| 5,660,193 A | | 8/1997 | Archer et al. |
| 6,823,878 B1 * | | 11/2004 | Gadini ................. 134/58 D |
| 2005/0241675 A1 * | | 11/2005 | Jung et al. ............. 134/18 |
| 2010/0269863 A1 * | | 10/2010 | Disch ................. 134/25.2 |

FOREIGN PATENT DOCUMENTS

| | | |
|---|---|---|
| EP | 0 678 274 | 10/1995 |
| EP | 1 121 893 | 8/2001 |
| JP | 2002-78661 | 3/2002 |
| JP | 2009-297356 | 12/2009 |
| KR | 1990-0006028 | 8/1990 |
| KR | 10-2005-0024546 | 3/2005 |
| KR | 10-2005-0102455 | 10/2005 |
| KR | 10-2007-0090483 | 9/2007 |
| KR | 10-2010-0052221 | 5/2010 |
| KR | 10-2010-0113730 | 12/2010 |

OTHER PUBLICATIONS

Korean Office Action dated Jun. 24, 2013.
International Search Report dated Feb. 20, 2013.
Korean Office Action dated Feb. 12, 2013.
Korean Office Action dated Feb. 13, 2013.

* cited by examiner

*Primary Examiner* — Joseph L. Perrin
*Assistant Examiner* — Levon J Shahinian
(74) *Attorney, Agent, or Firm* — KED & Associates, LLP

(57) ABSTRACT

Provided is a dish washer. The dish washer includes a tub configured to accommodate dishes, a sump configured to supply water to the tub, and a water supply device configured to supply water received from an outer source to the sump or the tub. The water supply device includes a body and a plurality of discharge parts. The body includes a water supply passage along which water supplied from an outer source flows and a water chamber in which water supplied through the water supply passage is stored. Water is discharged from the water supply passage to the water chamber through the discharge parts.

16 Claims, 9 Drawing Sheets

DISH WASHER

CROSS-REFERENCE TO RELATED APPLICATIONS

The present application claims priority under 35 U.S.C. 119 and 35 U.S.C. 365 to Korean Patent Application Nos. 10-2011-0088678 (filed on Sep. 1, 2011) and 10-2011-0088679 (filed on Sep. 1, 2011), which are hereby incorporated by reference in their entirety.

BACKGROUND

The present disclosure relates to a dish washer.

Generally, a dish washer includes: a dish rack disposed in a tub so that dishes can be placed thereon; an injection nozzle for injecting washing water to dishes placed on the dish rack; a sump for supplying washing water to the injection nozzle; a water supply device for supplying washing water to the sump; and a washing pump for pumping washing water out of the sump.

In the dish washer, washing water stored in the sump is injected through the injection nozzle as the washing pump operates. The washing water injected through the injection nozzle at a high pressure collides with dishes placed on the dish rack. Thus, contaminants can be removed from the dishes by the pressure of the washing water colliding with the dishes.

Dishes may be washed through a washing operation for removing contaminants from the dishes, a rinsing operation for rinsing the washed dishes, and a drying operation for removing moisture from the dishes.

SUMMARY

Embodiments provide a dish washer having improved efficiency for heat exchange between a water supply device and a tub.

Embodiments also provide a dish washer having improved drying efficiency.

In one embodiment, a dish washer includes: a tub configured to accommodate dishes; a sump configured to supply water to the tub; and a water supply device configured to supply water received from an outer source to the sump or the tub, wherein the water supply device includes: a body including a water supply passage along which water supplied from an outer source flows and a water chamber in which water supplied through the water supply passage is stored; and a plurality of discharge parts through which water is discharged from the water supply passage to the water chamber.

In another embodiment, there is provide a dish washer for performing a washing operation, a rinsing operation, and a drying operation, the dish washer including: a tub configured to accommodate dishes; a sump configured to supply water to the tub; and a water supply device configured to supply water received from an outer source to the sump or the tub, wherein water is intermittently supplied to the water supply device two or more times during the drying operation.

The details of one or more embodiments are set forth in the accompanying drawings and the description below. Other features will be apparent from the description and drawings, and from the claims.

DETAILED DESCRIPTION OF THE EMBODIMENTS

Figure 1:
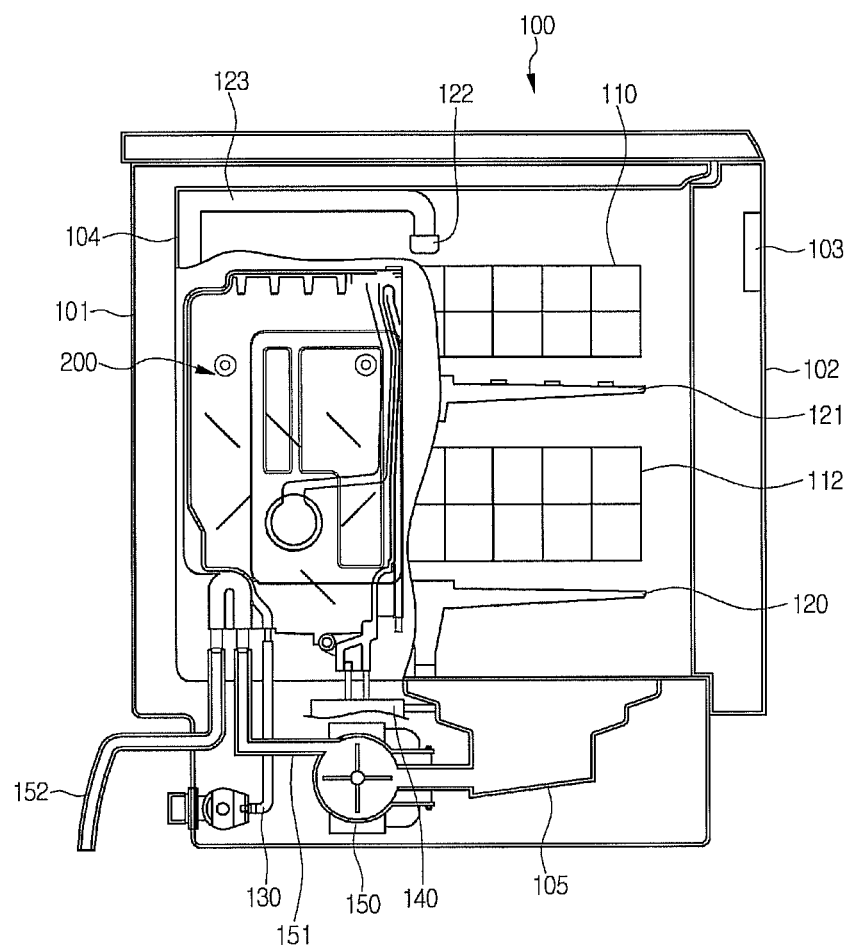
FIG. 1 is a schematic sectional view illustrating a dish washer according to a first embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present application. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

The spirit and scope of the present disclosure are not limited to exemplary embodiments described below. For example, the spirit and scope of the present disclosure include other embodiments derived by combining two or more such exemplary embodiments.

FIG. 1 is a schematic sectional view illustrating a dish washer 100 according to a first embodiment.

Referring to FIG. 1, the dish washer 100 of the first embodiment includes: a case 101 forming the exterior of the dish washer 100; a tub 104 disposed in the case 101 to form a space for washing; a sump 105 disposed under the tub 104 to collect washing water; and a door 102 for opening and closing the tub 104.

A control panel 103 for controlling operations of the dish washer 100 may be provided on the door 102. A plurality of racks are provided in the tub 104 for placing dishes on the racks. The racks may include an upper rack 110 and a lower rack 112 under the upper rack 110. In the current embodiment, two racks 110 and 112 are provided in the tub 104. However, the number of racks is not limited.

In addition, a plurality of washing nozzles may be provided in the tub 104 for injecting washing water supplied from the sump 105 to dishes placed on the racks 110 and 112.

The washing nozzles may include: a lower nozzle 120 connected to an upper portion of the sump 105; a middle nozzle 121 disposed above the lower nozzle 120 and configured to receive washing water from the sump 105; and a top nozzle 122 disposed above the middle nozzle 121 and configured to receive washing water from the sump 105.

A washing water guide 123 may be connected to the sump 105 for supplying washing water to the middle nozzle 121 and the top nozzle 122. The washing water guide 123 may include a single washing water passage or two washing water passages. In another embodiment, washing water may be supplied to the middle nozzle 121 and the top nozzle 122 through a plurality of washing water guides. In the current embodiment, three washing water nozzles are provided in the tub 104. However, the number of the washing water nozzles is not limited.

A drain pump 150 may be connected to the sump 105 for pumping washing water from the sump 105 to the outside of the dish washer 100.

The dish washer 100 may further include a water supply device 200 disposed between the tub 104 and the case 101. The water supply device 200 may store water to be used for washing dishes.

Generally, the dish washer 100 may completely wash dishes through a plurality of operations. The operations may include at least a washing operation for washing dishes and at least a rinsing operation for rinsing the dishes. According to the type of the dish washer 100, a drying operation may be performed after the rinsing operation.

The washing operation may be a single operation or may include a preliminary washing operation and a main washing operation. A heater (not shown) may not be operated in the preliminary operation but may be operated in the main washing operation. In the case where the washing operation is a single operation, the heater may be operated for at least a period of the washing operation.

The rinsing operation may be a single operation or may include a general rinsing operation and a thermal rinsing operation. The heater may not be operated in the general rinsing operation but may be operated in the thermal rinsing operation. In the case where the rinsing operation is a single operation, the heater may be operated for at least a period of the rinsing operation.

Before starting at least one of dish washing operations, water is supplied to the water supply device 200 from an outer water source. Then, water is stored in the water supply device 200 for the next operation.

Since the heater is operated in a main washing operation, the temperature of washing water is higher than the temperature of water stored in the water supply device 200. Therefore, it may be necessary to allow heat exchange between the tub 104 and water stored in the water supply device 200 before a general rinsing operation starts, so as to increase the efficiency of the general rinsing operation. In the case where a washing operation is a single operation, it may also be necessary to allow heat exchange between the tub 104 and water stored in the water supply device 200 before a rinsing operation starts, so as to increase the efficiency of the rinsing operation.

In a general rinsing operation, although the heater is not operated, the temperature of washing water may be higher than the temperature of water stored in the water supply device 200 due to residual heat in the tub 104. Therefore, it may be necessary to allow heat exchange between the tub 104 and water stored in the water supply device 200 before a thermal rinsing operation starts, so as to increase the efficiency of the thermal rinsing operation.

The structure of the water supply device 200 for improving the efficiency of heat exchange between the tub 104 and water stored in the water supply device 200 will now be described in detail.

Figure 2:
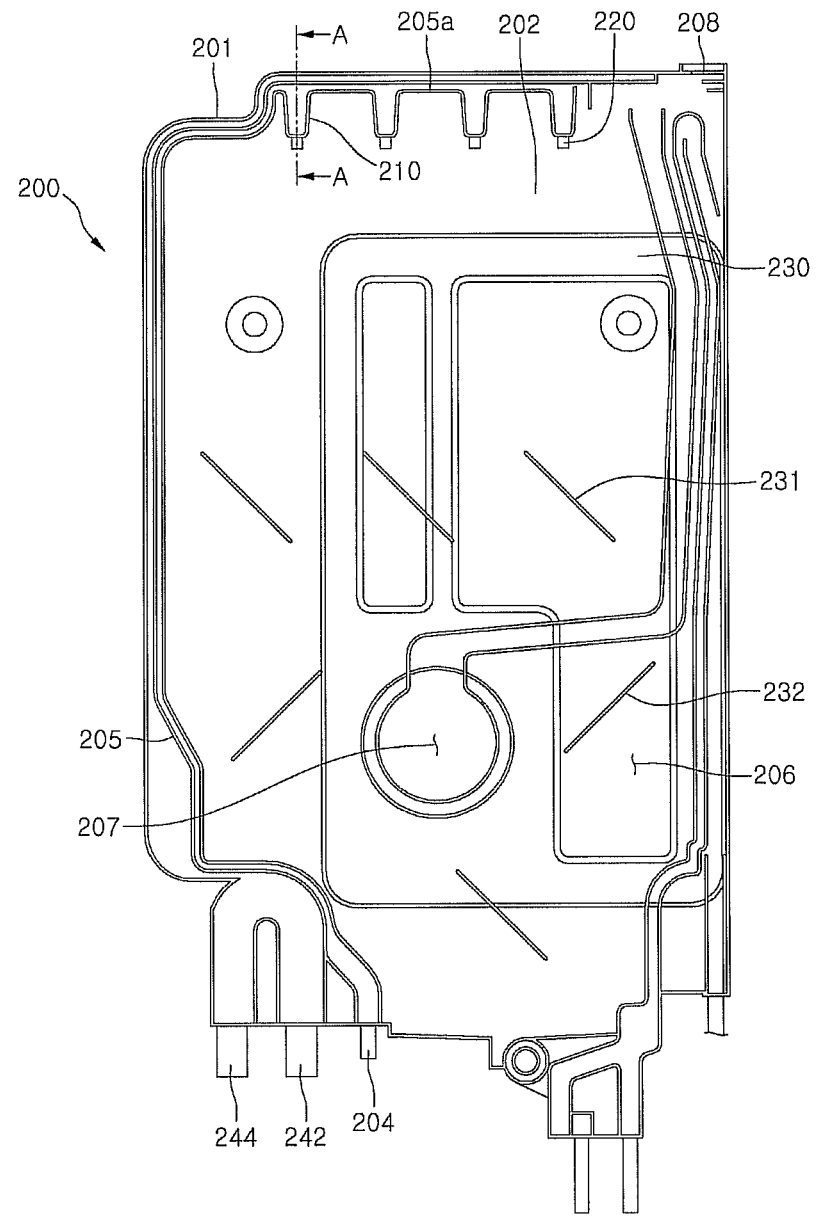
FIG. 2 is a sectional view illustrating a water supply device according to a first embodiment.
Figure 3:
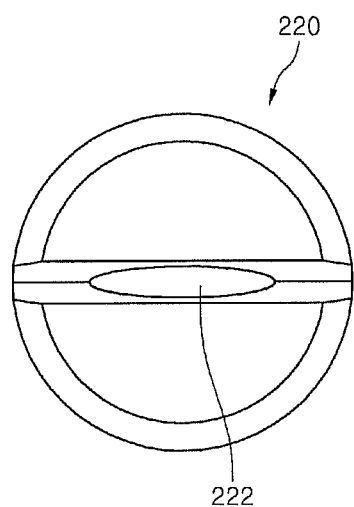
FIG. 3 is a bottom view illustrating a nozzle disposed in the water supply device.
Figure 4:
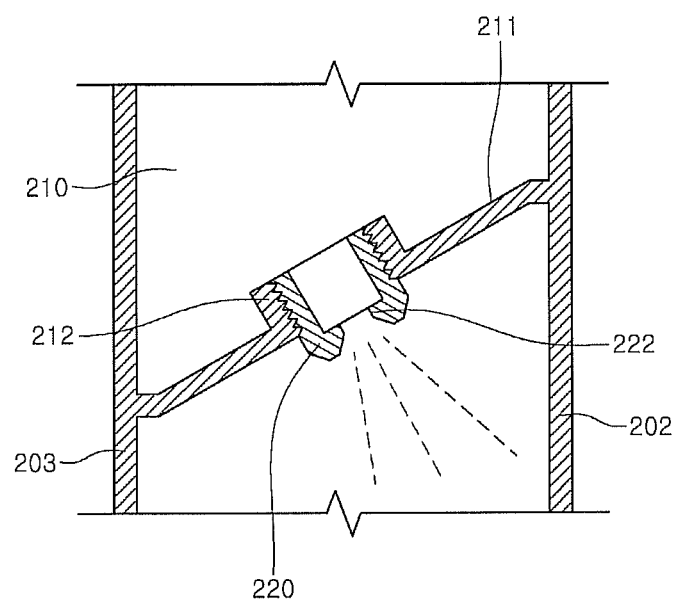
FIG. 4 is a sectional view taken along line A-A of FIG. 2.
Figure 5:
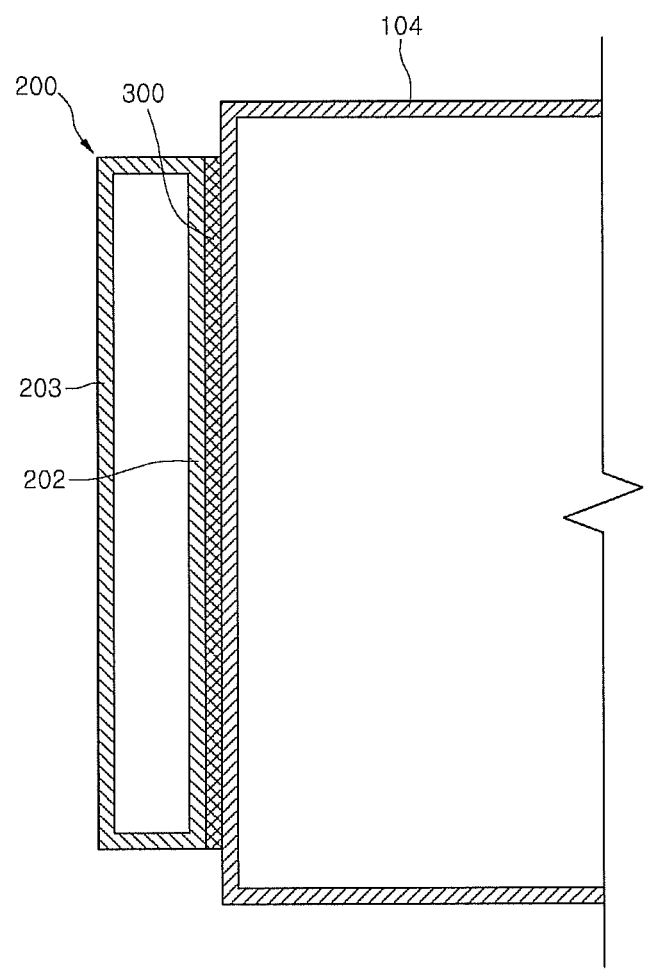
FIG. 5 is a view for explaining how the water supply device and a tub are arranged according to the first embodiment.

FIG. 2 is a sectional view illustrating the water supply device 200 according to a first embodiment; FIG. 3 is a bottom view illustrating a nozzle disposed in the water supply device 200; FIG. 4 is a sectional view taken along line A-A of FIG. 2; and FIG. 5 is a view for explaining how the water supply device 200 and the tub 104 are arranged according to the first embodiment.

Referring to FIGS. 2 to 5, the water supply device 200 of the first embodiment includes a body 201 forming the exterior of the water supply device 200. The body 201 may include a first surface 202 facing the tub 104 and a second surface 203 opposite to the first surface 202.

The first surface 202 may be in contact with the tub 104. In this case, heat is directly transferred between the first surface 202 and the tub 104. In another example, as shown in FIG. 5, a heat conductive member 300 may be disposed between the first surface 202 and the tub 104. In this case, heat is transferred between the first surface 202 and the tub 104 through the heat conductive member 300. The heat conductive member 300 may include a material such as a metal and an eGRAF (a product having graphite as a main component and manufactured by Graftech, USA).

The body 201 may include: a water inlet 204 to which a water supply tube 130 from an external water source (not shown) is connected; a water supply passage 205 through which water supplied through the water inlet 204 flows; and a water chamber 206 to which water supplied through the water supply passage 205 is stored.

The body 201 may further include a first drain connection part 242 to which a first drain passage 151 coming from the drain pump 150 is connected; and a second drain connection part 244 to which a second drain passage 152 is connected.

The body 201 may further include: an air inlet 208 through which external air can be introduced; and a connection hole 207 through which the body 201 communicates with the tub 104. The term "external air" is used to denote air outside the tub 104. That is, external air may be air in the case 101 or outside the case 101.

The body 201 may be connected to a water softener 140 used to remove hardness ions from water. Water stored in the water chamber 206 may be supplied to the water softener 140 to remove hardness ions from the water, and then the water may be supplied back to the body 201. Finally, the water may be supplied to the sump 105. Alternatively, water may be directly supplied to the sump 105 from the water softener 140. In another embodiment, the water softener 140 may not be used, and water may be directly supplied from the water chamber 206 to the sump 105 or the tub 104.

In detail, a portion of the water supply passage 205 extends from a lower side to an upper side of the body 201. Another portion of the water supply passage 205 extends horizontally along an upper side of the body 201. That is, the water supply passage 205 includes a horizontal (or upper) flow passage 205a. The horizontal flow passage 205a is located along the upper side of the body 201.

The horizontal flow passage 205a may include a plurality of discharge parts 210. The discharge parts 210 may extend downward from the horizontal flow passage 205a. The discharge parts 210 are horizontally arranged at predetermined intervals. Water may be discharged downward from the discharge parts 210.

Lower surfaces 211 of the discharge parts 210 are sloped. In detail, the lower surfaces 211 of the discharge parts 210 are sloped down in a direction from the first surface 202 to the second surface 203 of the body 201.

Nozzles 220 are provided on the lower surfaces 211 of the discharge parts 210, respectively, so as to inject water to the water chamber 206. Each of the nozzles 220 may be coupled to a nozzle coupling part 212 disposed on the lower surface 211 of the discharge part 210. For example, the outer surface of the nozzle 220 and the inner surface of the nozzle coupling part 212 may be threaded for coupling between the nozzle 220 and the nozzle coupling part 212. In another example, the nozzle 220 and the lower surface 211 of the discharge part 210 may be formed in one piece.

When the nozzle 220 is coupled to the discharge part 210, the nozzle 220 may be coupled to the lower surface 211 of the discharge part 210 in a direction normal to the lower surface 211. Therefore, water may be injected through the nozzle 220 in a direction making an angle with a vertical direction as shown in FIG. 4. That is, water may be injected through the nozzle 220 in a direction toward the first surface 202 of the body 201. Water injected toward the first surface 202 of the body 201 flows down on the first surface 202.

As described above, since water injected through the nozzle 220 flows down on the first surface 202 of the body 201, the water can make contact with the body 201 in a larger area for a longer period of time, and thus heat exchange between the water and the tub 104 can be facilitated.

In another example, the lower surface 211 of the discharge part 210 may be horizontal. In this case, the nozzle 220 may be coupled to the lower surface 211 of the discharge part 210 at an oblique angle, or the nozzle 220 and the lower surface 211 of the discharge part 210 may be formed in one piece with an oblique angle between the nozzle 220 and the lower surface 211 of the discharge part 210. Then, water can be injected through the nozzle 220 in a direction toward the first surface 202 of the body 201.

The nozzle 220 includes an injection hole 222. The injection hole 222 has a non-circular shape. For example, the injection hole 222 may have a long-hole shape, an elliptical shape, or the like. The injection hole 222 may be long in a direction along which the discharge parts 210 are arranged. Therefore, water may be widely injected (to the left and right sides in FIG. 2), and thus the water may make contact with the body 201 in a larger area for a longer period of time.

In summary, water may injected through the nozzles 220 in a downward direction, and the nozzles 220 (the discharge parts 210) may be arranged in a left-to-right direction (or front-to-back direction) crossing the downward direction.

A forming part 230 is disposed on at least the first surface 202 of the body 201 so as to increase a contact area between the body 201 and water injected through the nozzles 220. The forming part 230 may be formed be recessing a portion of the first surface 202 toward the second surface 203.

Another forming part (not shown) may be disposed at a position of the tub 104 corresponding to the forming part 230. In this case, the forming part of the tub 104 may be in contact with the forming part 230 of the body 201 so that heat exchange can occur along a larger contact area.

A plurality of flow guides 231 and 232 may be disposed on the first surface 202 or the second surface 203 of the body 201 so as to prevent water from falling vertically. The flow guides 231 and 232 may include first flow guides 231 sloped in a first direction and second flow guides 232 sloped in a second direction opposite to the first direction. That is, referring to FIG. 2, the first flow guides 231 are sloped down from the left to the right, and the second flow guides 232 are sloped down from the right to the left.

In the current embodiment, the flow guides 231 and 232 are shown as exemplary structures. That is, the directions, lengths, and shapes of the flow guides 231 and 232 are not limited as long as vertical falling of injected water can be prevented. The flow guides 231 and 232 may have predetermined lengths in the left-to-right direction in FIG. 2 so as to prevent vertical falling of water.

As described above, according to the current embodiment, during a predetermined operation, water to be used in the next operation is supplied to the water supply device 200. Therefore, water supplied to the water supply device 200 can exchange heat with the tub 104, and thus the efficiency of the next operation can be improved.

In addition, the efficiency of heat exchange between the tub 104 and water stored in the water supply device 200 can be increased because the contact area between the water and the first surface 202 of the body 201 is increased owing to the positions of the plurality of discharge parts 210, the nozzles 220 provided on the discharge parts 210, the water injection directions of the nozzles 220, the forming part 230 of the body 201, and the flow guides 231 and 232.

Figure 6:
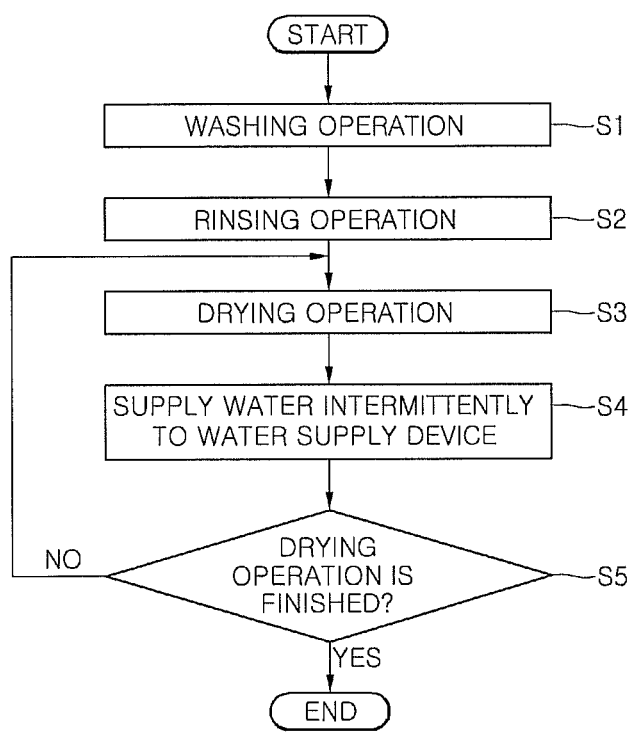
FIG. 6 is a flowchart for explaining a method of controlling the dish washer of the first embodiment.

FIG. 6 is a flowchart for explaining a method of controlling the dish washer 100 of the first embodiment.

Referring to FIG. 6, if the dish washer 100 of the first embodiment is operated, a washing operation S1 and a rinsing operation S2 are sequentially performed. After the rinsing operation S2, washing water drains and a drying operation S3 is performed. In the drying operation S3, external air and air contained in the tub 104 are introduced into a condenser (not shown) are mixed together. In this way, moisture is removed from the inside air of the tub 104.

During the drying operation S3, water is intermittently supplied to the water supply device 200. When a drying operation is performed in a dish washer of the related art, since washing water is not used, water is not supplied to a water supply device although washing water drained before the drying operation. However, according to the embodiment, during the drying operation S3, water is supplied to the water supply device 200.

As described above, since water supplied to the water supply device 200 exchanges heat with the tub 104, a surface of the tub 104 through which heat is transferred to the water supply device 200 can be cooled, and thus moisture can be easily removed from hot and humid air of the tub 104. As a result, the drying operation S3 can be rapidly performed at high efficiency.

In detail, after a first period of time (for example, 15 minutes) from the start of the drying operation S3, water is supplied to the water supply device 200 for a first reference period of time. That is, after the first period time from the start of the drying operation S3, a water supply valve (not shown) is opened to supply water to the water supply device 200.

At this time, as described above, the efficiency of heat exchange between the tub 104 and water stored in the water supply device 200 can be increased because the contact area between the water and the first surface 202 of the body 201 is increased owing to the positions of the plurality of discharge parts 210, the nozzles 220 provided on the discharge parts 210, the water injection directions of the nozzles 220, the forming part 230 of the body 201, and the flow guides 231 and 232.

After water is supplied to the water supply device 200 for the first reference period of time, supply of water is stopped. Then, after a second period of time (for example, 30 minutes longer than the first period of time) from the start of the drying operation S3, water is further supplied to the water supply device 200 for a second reference period of time, and then the supply of water is stopped. At this time, the amount of water supplied to the water supply device 200 at a time may be less than half the volume of the water chamber 206.

Thereafter, during the drying operation S3, it is determined whether drying is completed (operation S5). If it is determined that drying is completed, the dish washer 100 is opened.

After the drying operation S3, water supplied to the water supply device 200 during the drying operation S3 may drain through the sump 105 or may be used in the next washing operation.

In the current embodiment, the first period time and the second period of time may be included in the first half of the drying operation S3.

In another embodiment, the first period of time may be included in the first half of the drying operation S3, and the second period of time may be included in the second half of the drying operation S3. In other words, water may be supplied to the water supply device 200 one or more times in the first half of the drying operation S3, and water may also be supplied to the water supply device 200 one or more times in the second half of the drying operation S3.

If water is supplied to the water supply device 200 as soon as the drying operation S3 starts, although the first surface 202 of the water supply device 200 can be rapidly cooled at the beginning of the drying operation S3, moisture may not be efficiently removed from air contained in the tub 104 because the temperature of the water stored in the water supply device 200 increases as the drying operation S3 proceeds.

In the current embodiment, since the temperature of the first surface 202 of the water supply device 200 and the temperature of air inside the tub 104 (or the temperature of a surface of the tub 104 facing the first surface 202 of the water supply device 200) are affected by each other, the efficient of dehumidifying the inside of the tub 104 may be varied according to the temperature of the first surface 202 of the water supply device 200.

However, if water is supplied to the water supply device 200 after the first period time and the second period of time from the start of the drying operation S3, the temperature of the first surface 202 of the water supply device 200 can be rapidly reduced with the supply of water, and the temperature of the water supplied to the water supply device 200 may be less increased because the temperature of the first surface 202 of the water supply device 200 is already being reduced.

As described above, according to the current embodiment, since water is intermittently supplied to the water supply device 200 during the drying operation S3, the first surface 202 of the water supply device 200 can be reduced to increase the efficiency of removing moisture from air inside of the tub 104.

In addition, the temperature of the first surface 202 of the water supply device 200 can be largely reduced because the contact area between water supplied to the water supply device 200 and the first surface 202 of the body 201 is increased owing to the positions of the plurality of discharge parts 210, the nozzles 220 provided on the discharge parts 210, the water injection directions of the nozzles 220, the forming part 230 of the body 201, and the flow guides 231 and 232.

In the current embodiment, the first period of time, the second period of time, the first reference period of time, and the second reference period of time may be varied according to the operation time of the drying operation S3, and the operation time of the drying operation S3 may be varied according to the number of dishes to be dried.

Figure 7:
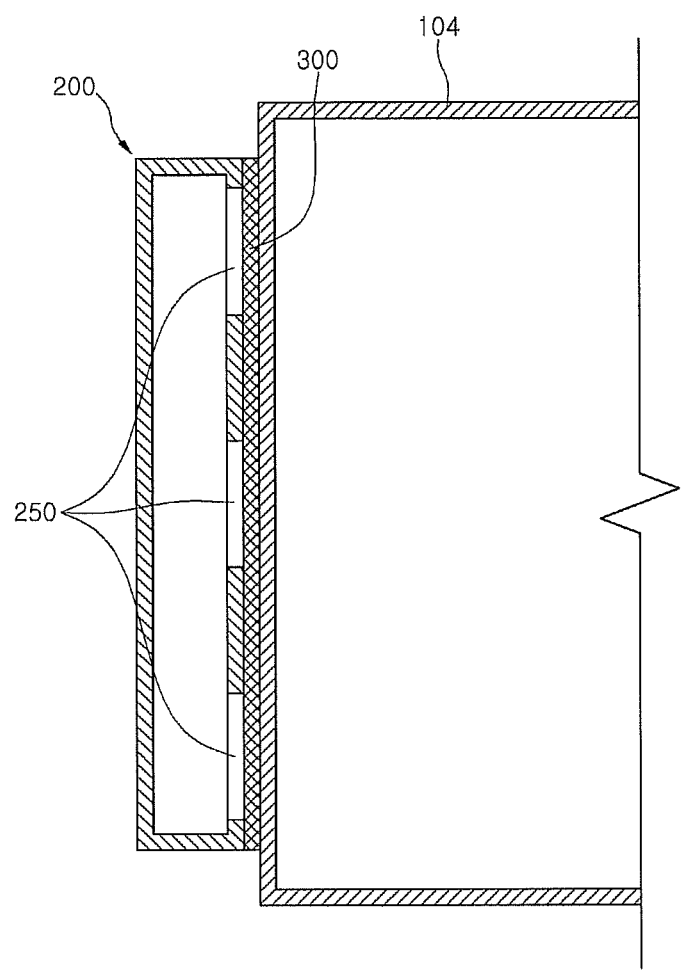
FIG. 7 is a view for explaining how a water supply device and a tub are arranged according to a second embodiment.

FIG. 7 is a view for explaining how a water supply device 200 and a tub 104 are arranged according to a second embodiment.

The second embodiment is the same as the first embodiment except for a heat exchange structure between the water supply device 200 and the tub 104. Thus, characteristic parts of the second embodiment will be mainly described in the following description.

Referring to FIG. 7, in the second embodiment, at least one opening 250 is formed in a first surface 202 of the water supply device 200 facing the tub 104. A heat conductive member 300 such as the heat conductive member 300 explained in the first embodiment may be disposed between the water supply device 200 and the tub 104. At this time, the heat conductive member 300 may cover the opening 250 from the outside of the water supply device 200.

In the current embodiment, water stored in the water supply device 200 may be partially in contact with the heat conductive member 300 for efficient heat exchange with the tub 104.

At this time, the heat conductive member 300 may be placed on the opening 250 to cover the opening 250. In this case, the heat conductive member 300 and the first surface 202 of the water supply device 200 may be in contact with the tub 104.

Figure 8:
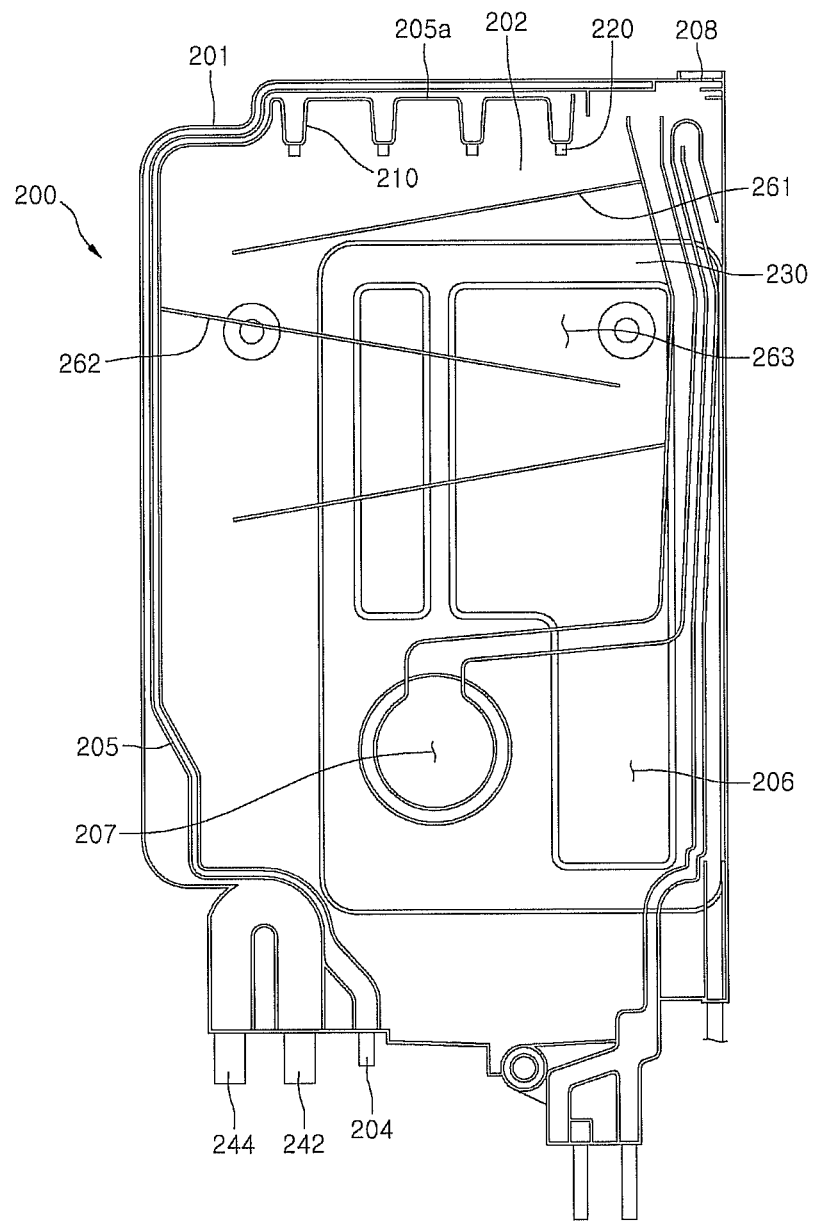
FIG. 8 is a schematic sectional view illustrating a water supply device according to a third embodiment.

FIG. 8 is a schematic sectional view illustrating a water supply device 200 according to a third embodiment.

The third embodiment is the same as the first embodiment except for a flow guide structure. Thus, characteristic parts of the third embodiment will be mainly described in the following description.

Referring to FIG. 8, the water supply device 200 of the current embodiment includes a plurality of flow guides 261 and 262 forming a zigzag flow passage 263 so that water injected through nozzles 220 can flow along a zigzag path in a water chamber 206.

The flow guides 261 and 262 include: at least one first flow guide 261 sloped down from the right to the left side when viewed in FIG. 8; and at least one second flow guide 262 spaced apart from the first flow guide 261 in a vertical direction and sloped down from the left to the right side when viewed in FIG. 8. The first and second flow guides 261 and 262 may be alternately arranged in the vertical direction.

In the current embodiment, water injected through the nozzles 220 may flow down in a zigzag path in the water supply device 200 while making contact with a first surface 202 of a body 201 of the water supply device 200. Thus, the efficiency of heat exchange between the water supply device 200 and the tub 104 can be improved.

Figure 9:
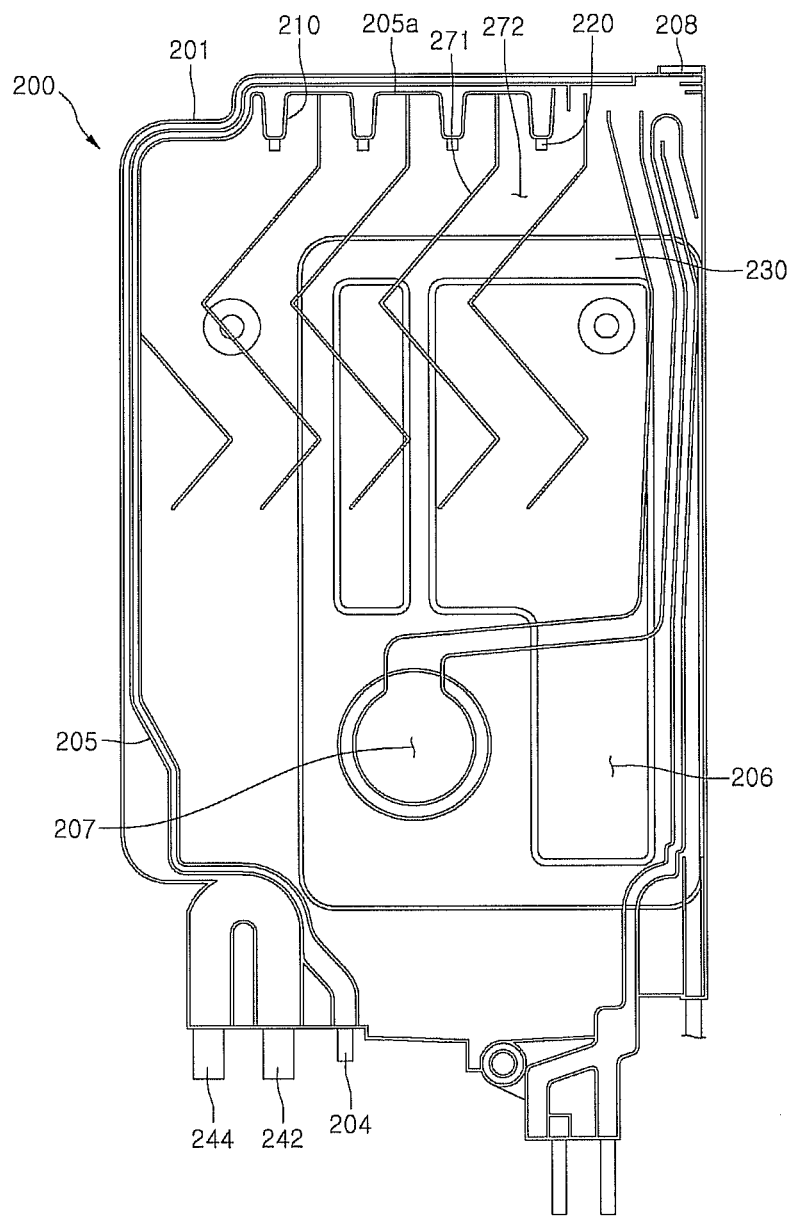
FIG. 9 is a schematic sectional view illustrating a water supply device according to a fourth embodiment.

FIG. 9 is a schematic sectional view illustrating a water supply device 200 according to a fourth embodiment.

The third embodiment is the same as the first embodiment except for a flow guide structure. Thus, characteristic parts of the fourth embodiment will be mainly described in the following description.

Referring to FIG. 9, the water supply device 200 of the fourth embodiment includes a plurality of flow guides 271 so that water injected through nozzles 220 can flow along paths arranged in a left-to-right direction. That is, a plurality of flow passages 272 are defined in the water chamber 206 by the flow guides 271. The flow guides 271 are bent in a zigzag shape so that the flow passages 272 can have a zigzag shape.

In the current embodiment, since the flow passages 272 are defined by the flow guides 271, water can flow across the entirety of the water supply device 200, and thus the efficiency of heat exchange between the water supply device 200 and a tub 104 can be improved.

According to the embodiments, during a predetermined operation, water to be used in the next operation is supplied to the water supply device. Therefore, water supplied to the water supply device can exchange heat with the tub, and thus the efficiency of the next operation can be improved.

In addition, the efficiency of heat exchange between water stored in the water supply device and the tub can be improved because the contact area between the water and the first surface of the body can be increased owing to the positions of the plurality of discharge parts, the nozzles provided on the discharge parts, the water injection directions of the nozzles, the forming part of the body, and the flow guides.

In addition, since water is intermittently supplied to the water supply device during a drying operation, a surface of the water supply device facing the tub can be cooled to increase the efficiency of removing moisture from air inside of the tub.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dish washer, comprising:
   a tub configured to accommodate dishes;
   a sump configured to supply water to the tub; and
   a water supply device configured to supply water received from an outer source to the sump or the tub, wherein the water supply device comprises:
      a body comprising a water supply passage through which the water supplied from the outer source flows and a water chamber in which the water supplied through the water supply passage is stored; and
      a plurality of discharge ports through which the water is discharged from the water supply passage to the water chamber, wherein the body is directly in contact with the tub to provide heat exchange between the water stored in the water chamber and the tub, wherein each of the plurality of discharge ports includes a nozzle and a sloped lower surface, wherein the nozzle is disposed at the respective sloped lower surface, wherein the sloped lower surface of each of the plurality of discharge ports includes a nozzle coupling device, and wherein the respective nozzle is coupled to the respective nozzle coupling device.

2. The dish washer according to claim 1, wherein the plurality of discharge ports is horizontally arranged at predetermined intervals.

3. The dish washer according to claim 1, wherein the water supply passage comprises an upper flow passage disposed at an upper site of the body, and wherein the plurality of discharge ports is disposed at the upper flow passage.

4. The dish washer according to claim 3, wherein the plurality of discharge ports extends downward from the upper flow passage, and wherein the water is discharged downward from the plurality of discharged ports.

5. The dish washer according to claim 1, wherein the nozzle is disposed at a lower surface of the plurality of discharge ports, respectively, and wherein the nozzle makes an oblique angle with the respective lower surface.

6. The dish washer according to claim 1, wherein the nozzle comprises an injection hole, and wherein the injection hole is elongated in a direction along which the plurality of discharge ports is arranged.

7. The dish washer according to claim 1, Wherein the body includes a first surface that faces the tub and a second surface opposite to the first surface, and wherein the water in the water supply passage is discharged through the plurality of discharge ports in a direction toward the first surface.

8. The dish washer according to claim 7, wherein a forming part is disposed on the first surface that increases a contact area between the first surface and the water discharged through the plurality of discharge ports.

9. The dish washer according to claim 7, wherein at least one flow guide is disposed on the first surface or the second surface that prevents vertical falling of the water discharged through the plurality of discharge ports.

10. The dish washer according to claim 9, wherein the at least one flow guide is inclined in a direction along which the plurality of discharge ports is arranged.

11. The dish washer according to claim 9, wherein the at least one flow guide defines a plurality of flow passages so that the water discharged through the plurality of discharge ports flows along the plurality of flow passages.

12. The dish washer according to claim 7, wherein at least one opening is formed in the first surface, and a heat conductive member covers the at least one opening.

13. The dish washer according to claim 1, wherein the dish washer performs a washing operation, a rinsing operation, and a drying operation, and wherein the water is intermittently supplied to the water supply device two or more times during the drying operation.

14. The dish washer according to claim 1, wherein the body further comprises an air inlet through which external air is introduced in the body.

15. A dish washer, comprising:
   a tub configured to accommodate dishes;
   a sump configured to supply water to the tub;
   a water supply device configured to supply the water received from an outer source to the sump or the tub; and
   a heat conductive member disposed between a first surface of the water supply device and the tub, wherein the water supply device comprises:
      a body comprising a water supply passage through which the water supplied from the outer source flows and a water chamber in which the water supplied through the water supply passage is stored; and
      a plurality of discharge ports through which the water is discharged from the water supply passage to the water chamber, wherein the heat conductive member comprises a first surface that faces the body and a second surface that faces the tub, and wherein the first surface of the heat conductive member is directly in contact with the body and the second surface is directly in contact the tub to heat exchange between the water stored in the water chamber and the tub.

16. A dish washer, comprising:
   a tub configured to accommodate dishes;
   a sump configured to supply water to the tub; and
   a water supply device configured to supply the water received from an outer source to the sump or the tub, wherein the water supply device comprises:
      a body comprising:
         a water supply passage through which the water supplied from the outer source flows, disposed within the body;

a water chamber in which the water supplied through the water supply passage is stored;

a plurality of discharge ports through which the water is discharged from the water supply passage to the water chamber; and at least one nozzle provided at one of the plurality of discharge ports, wherein the body further comprises a first surface that faces the tub wherein the at least one nozzle injects the water in the water supply passage toward the first surface of the body, and wherein an injection direction of the water from the at least one nozzle crosses the first surface of the body.

\* \* \* \* \*